(12) United States Patent
Cristobal et al.

(10) Patent No.: US 10,078,604 B1
(45) Date of Patent: Sep. 18, 2018

(54) INTERRUPT COALESCING

(71) Applicant: BiTMICRO Networks, Inc., Fremont, CA (US)

(72) Inventors: Arnaldo Cristobal, Bocaue (PH); Marlon Verdan, Paranaque (PH)

(73) Assignee: BiTMICRO Networks, Inc., Fremont, CA (US)

( * ) Notice: Subject to any disclaimer, the term of this patent is extended or adjusted under 35 U.S.C. 154(b) by 184 days.

(21) Appl. No.: 14/690,349

(22) Filed: Apr. 17, 2015

Related U.S. Application Data

(60) Provisional application No. 61/980,632, filed on Apr. 17, 2014.

(51) Int. Cl.
*G06F 13/24* (2006.01)
*G06F 9/48* (2006.01)

(52) U.S. Cl.
CPC .......... *G06F 13/24* (2013.01); *G06F 9/4825* (2013.01)

(58) Field of Classification Search
CPC ............ G06F 13/24; G06F 2213/2414; G06F 2213/2404; G06F 9/4806
See application file for complete search history.

(56) References Cited

U.S. PATENT DOCUMENTS

| | | |
|---|---|---|
| 4,402,040 A | 8/1983 | Evett |
| 4,403,283 A | 9/1983 | Myntii et al. |
| 4,752,871 A | 6/1988 | Sparks |
| 4,967,344 A | 10/1990 | Scavezze et al. |
| 5,111,058 A | 5/1992 | Martin |
| RE34,100 E | 10/1992 | Hartness |
| 5,222,046 A | 6/1993 | Kreifels et al. |
| 5,297,148 A | 3/1994 | Harari et al. |
| 5,339,404 A | 8/1994 | Vandling, III |
| 5,341,339 A | 8/1994 | Wells |
| 5,371,709 A | 12/1994 | Fisher et al. |

(Continued)

FOREIGN PATENT DOCUMENTS

| | | |
|---|---|---|
| JP | 2005142859 A | 6/2005 |
| JP | 2005-309847 | 11/2005 |

(Continued)

OTHER PUBLICATIONS

Office Action dated Dec. 5, 2014 for U.S. Appl. No. 14/038,684.

(Continued)

*Primary Examiner* — Farley Abad

(57) ABSTRACT

In an embodiment of the invention, a method comprises: collecting a plurality of interrupts and servicing coalesced active interrupts to a processor if an interrupt count limit has occurred or if a timeout count has expired. In another embodiment of the invention, an apparatus comprises: an interrupt controller configured to collect a plurality of interrupts and configured to service coalesced active interrupts to a processor if an interrupt count limit has occurred or if a timeout count has expired. In yet another embodiment of the invention, an article of manufacture comprises: a non-transient computer-readable medium having stored thereon instructions that permit a method comprising: collecting a plurality of interrupts and servicing coalesced active interrupts to a processor if an interrupt count limit has occurred or if a timeout count has expired.

18 Claims, 3 Drawing Sheets

(56) References Cited

U.S. PATENT DOCUMENTS

| | | |
|---|---|---|
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,708,814 A | 1/1998 | Short et al. |
| 5,737,742 A | 4/1998 | Achiwa et al. |
| 5,765,023 A | 6/1998 | Leger et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,818,029 A | 10/1998 | Thomson |
| 5,819,307 A | 10/1998 | Iwamoto et al. |
| 5,822,251 A | 10/1998 | Bruce et al. |
| 5,864,653 A | 1/1999 | Tavallaei et al. |
| 5,870,627 A | 2/1999 | O'Toole et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,930,481 A | 7/1999 | Benhase |
| 5,933,849 A | 8/1999 | Srbljic et al. |
| 5,943,421 A | 8/1999 | Grabon |
| 5,956,743 A | 9/1999 | Bruce et al. |
| 5,978,866 A | 11/1999 | Nain |
| 5,987,621 A | 11/1999 | Duso |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,138,200 A | 10/2000 | Ogilvie |
| 6,138,247 A | 10/2000 | McKay et al. |
| 6,151,641 A | 11/2000 | Herbert |
| 6,215,875 B1 | 4/2001 | Nohda |
| 6,230,269 B1 | 5/2001 | Spies et al. |
| 6,298,071 B1 | 10/2001 | Taylor et al. |
| 6,341,342 B1 | 1/2002 | Thompson et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,452,602 B1 | 9/2002 | Morein |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,574,142 B2 | 6/2003 | Gelke |
| 6,601,126 B1 | 7/2003 | Zaidi et al. |
| 6,678,754 B1 | 1/2004 | Soulier |
| 6,728,840 B1 | 4/2004 | Shatil |
| 6,744,635 B2 | 6/2004 | Portman et al. |
| 6,785,746 B1 | 8/2004 | Mahmoud et al. |
| 6,757,845 B2 | 12/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,963,946 B1 | 11/2005 | Dwork et al. |
| 6,970,446 B2 | 11/2005 | Krischar et al. |
| 6,970,890 B1 | 11/2005 | Bruce et al. |
| 6,973,546 B2 | 12/2005 | Johnson |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 6/2008 | Fujimoto et al. |
| 7,386,662 B1 | 6/2008 | Kekre et al. |
| 7,412,631 B2 | 8/2008 | Uddenberg et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,474,926 B1 | 1/2009 | Carr et al. |
| 7,478,186 B1 * | 1/2009 | Onufryk ............... G06F 13/24 710/263 |
| 7,490,177 B2 | 2/2009 | Kao |
| 7,496,699 B2 | 2/2009 | Pope et al. |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,620,749 B2 | 11/2009 | Biran et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,668,925 B1 | 2/2010 | Liao et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,719,287 B2 | 5/2010 | Marks et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 7,958,295 B1 | 6/2011 | Liao et al. |
| 7,979,614 B1 | 7/2011 | Yang |
| 7,996,581 B2 | 8/2011 | Bond et al. |
| 8,010,740 B2 | 10/2011 | Arcedera et al. |
| 8,032,700 B2 | 10/2011 | Bruce et al. |
| 8,156,279 B2 | 4/2012 | Tanaka et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,219,719 B1 | 7/2012 | Parry et al. |
| 8,225,022 B2 | 7/2012 | Caulkins |
| 8,341,300 B1 | 12/2012 | Karamcheti |
| 8,341,311 B1 | 12/2012 | Szewerenko et al. |
| 8,375,257 B2 | 2/2013 | Hong et al. |
| 8,447,908 B2 | 5/2013 | Bruce et al. |
| 8,489,914 B2 | 7/2013 | Cagno |
| 8,510,631 B2 | 8/2013 | Wu et al. |
| 8,560,804 B2 | 10/2013 | Bruce et al. |
| 8,583,868 B2 | 11/2013 | Belluomini et al. |
| 8,677,042 B2 * | 3/2014 | Gupta ................... G06F 9/4812 710/260 |
| 8,707,134 B2 | 4/2014 | Takahashi et al. |

(56) References Cited

U.S. PATENT DOCUMENTS

| | | |
|---|---|---|
| 8,713,417 B2 | 4/2014 | Jo |
| 8,762,609 B1 | 6/2014 | Lam et al. |
| 8,788,725 B2 | 7/2014 | Bruce et al. |
| 8,832,371 B2 | 9/2014 | Uehara et al. |
| 8,856,392 B2 | 10/2014 | Myrah et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 9,158,661 B2 | 10/2015 | Blaine et al. |
| 9,201,790 B2 | 12/2015 | Keeler |
| 9,400,617 B2 | 7/2016 | Ponce et al. |
| 2001/0010066 A1 | 7/2001 | Chin et al. |
| 2002/0011607 A1 | 1/2002 | Gelke et al. |
| 2002/0013880 A1 | 1/2002 | Gappisch et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0097248 A1 | 5/2003 | Terashima et al. |
| 2003/0120864 A1 | 6/2003 | Lee et al. |
| 2003/0126451 A1 | 7/2003 | Gorobets |
| 2003/0131201 A1 | 7/2003 | Khare et al. |
| 2003/0161355 A1 | 8/2003 | Falcomato et al. |
| 2003/0163624 A1 | 8/2003 | Matsui et al. |
| 2003/0163647 A1 | 8/2003 | Cameron et al. |
| 2003/0163649 A1 | 8/2003 | Kapur et al. |
| 2003/0182576 A1 | 9/2003 | Morlang et al. |
| 2003/0188100 A1 | 10/2003 | Solomon et al. |
| 2003/0204675 A1 | 10/2003 | Dover et al. |
| 2003/0217202 A1 | 11/2003 | Zilberman et al. |
| 2003/0223585 A1 | 12/2003 | Tardo et al. |
| 2004/0073721 A1 | 4/2004 | Goff et al. |
| 2004/0078632 A1 | 4/2004 | Infante et al. |
| 2004/0128553 A1 | 7/2004 | Buer et al. |
| 2004/0215868 A1 | 10/2004 | Solomon et al. |
| 2005/0050245 A1 | 3/2005 | Miller et al. |
| 2005/0055481 A1 | 3/2005 | Chou et al. |
| 2005/0078016 A1 | 4/2005 | Neff |
| 2005/0080952 A1 | 4/2005 | Oner et al. |
| 2005/0097368 A1 | 5/2005 | Peinado et al. |
| 2005/0120146 A1 | 6/2005 | Chen et al. |
| 2005/0210149 A1 | 9/2005 | Kimball |
| 2005/0210159 A1 | 9/2005 | Voorhees et al. |
| 2005/0226407 A1 | 10/2005 | Kasuya et al. |
| 2005/0240707 A1 | 10/2005 | Hayashi et al. |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0026329 A1 | 2/2006 | Yu |
| 2006/0031450 A1 | 2/2006 | Unrau et al. |
| 2006/0039406 A1 | 2/2006 | Day et al. |
| 2006/0064520 A1* | 3/2006 | Anand .................. G06F 13/24 710/52 |
| 2006/0095709 A1 | 5/2006 | Achiwa |
| 2006/0112251 A1 | 5/2006 | Karr et al. |
| 2006/0129876 A1 | 6/2006 | Uemura |
| 2006/0173970 A1 | 8/2006 | Pope et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0079017 A1 | 4/2007 | Brink et al. |
| 2007/0083680 A1 | 4/2007 | King et al. |
| 2007/0088864 A1 | 4/2007 | Foster |
| 2007/0093124 A1 | 4/2007 | Varney et al. |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2007/0294572 A1 | 12/2007 | Kalwitz et al. |
| 2008/0005481 A1 | 1/2008 | Walker |
| 2008/0052456 A1 | 2/2008 | Ash et al. |
| 2008/0052585 A1 | 2/2008 | LaBerge et al. |
| 2008/0072031 A1 | 3/2008 | Choi |
| 2008/0104264 A1 | 5/2008 | Duerk et al. |
| 2008/0140724 A1 | 6/2008 | Flynn et al. |
| 2008/0147946 A1* | 6/2008 | Pesavento .............. G06F 13/26 710/265 |
| 2008/0147963 A1 | 6/2008 | Tsai et al. |
| 2008/0189466 A1 | 8/2008 | Hemmi |
| 2008/0195800 A1 | 8/2008 | Lee et al. |
| 2008/0218230 A1 | 9/2008 | Shim |
| 2008/0228959 A1 | 9/2008 | Wang |
| 2008/0276037 A1 | 11/2008 | Chang et al. |
| 2008/0301256 A1 | 12/2008 | McWilliams et al. |
| 2009/0028229 A1 | 1/2009 | Cagno et al. |
| 2009/0037565 A1 | 2/2009 | Andresen et al. |
| 2009/0055573 A1 | 2/2009 | Ito |
| 2009/0077306 A1 | 3/2009 | Arcedera et al. |
| 2009/0083022 A1 | 3/2009 | Nordin et al. |
| 2009/0094411 A1 | 4/2009 | Que |
| 2009/0132620 A1 | 5/2009 | Arakawa |
| 2009/0132752 A1 | 5/2009 | Poo et al. |
| 2009/0150643 A1 | 6/2009 | Jones et al. |
| 2009/0158085 A1 | 6/2009 | Kern et al. |
| 2009/0172250 A1 | 7/2009 | Allen et al. |
| 2009/0172261 A1 | 7/2009 | Prins et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2010/0268904 A1 | 10/2010 | Sheffield et al. |
| 2010/0299538 A1 | 11/2010 | Miller |
| 2010/0318706 A1 | 12/2010 | Kobayashi |
| 2011/0022778 A1 | 1/2011 | Schibilla et al. |
| 2011/0022783 A1 | 1/2011 | Moshayedi |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0133826 A1* | 6/2011 | Jones ...................... G06F 15/78 327/564 |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0173383 A1 | 7/2011 | Gorobets |
| 2011/0197011 A1 | 8/2011 | Suzuki et al. |
| 2011/0202709 A1 | 8/2011 | Rychlik |
| 2011/0208901 A1 | 8/2011 | Kim et al. |
| 2011/0208914 A1 | 8/2011 | Winokur et al. |
| 2011/0219150 A1 | 9/2011 | Piccirillo et al. |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0079352 A1 | 3/2012 | Frost et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0159029 A1 | 6/2012 | Krishnan et al. |
| 2012/0161568 A1 | 6/2012 | Umemoto et al. |
| 2012/0173795 A1 | 7/2012 | Schuette et al. |
| 2012/0215973 A1 | 8/2012 | Cagno et al. |
| 2012/0249302 A1 | 10/2012 | Szu |
| 2012/0260102 A1 | 10/2012 | Zaks et al. |
| 2012/0271967 A1 | 10/2012 | Hirschman |

(56) References Cited

U.S. PATENT DOCUMENTS

| | | |
|---|---|---|
| 2012/0303924 A1 | 11/2012 | Ross |
| 2012/0311197 A1 | 12/2012 | Larson et al. |
| 2012/0324277 A1 | 12/2012 | Weston-Lewis et al. |
| 2013/0010058 A1 | 1/2013 | Pomeroy |
| 2013/0019053 A1 | 1/2013 | Somanache et al. |
| 2013/0073821 A1 | 3/2013 | Flynn et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0206837 A1 | 8/2013 | Szu |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0212425 A1 | 8/2013 | Blaine et al. |
| 2013/0246694 A1 | 9/2013 | Bruce et al. |
| 2013/0254435 A1 | 9/2013 | Shapiro et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0068177 A1 | 3/2014 | Raghavan |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action dated Oct. 8, 2015 for U.S. Appl. No. 14/217,291.
Notice of allowance/allowability for U.S. Appl. No. 14/214,216 dated Apr. 27, 2016.
Notice of allowance/allowability for U.S. Appl. No. 14/217,436 dated May 6, 2016.
Office Action for U.S. Appl. No. 13/475,878, dated Jun. 23, 2014.
Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Notice of Allowance for U.S. Appl. No. 14/215,414 dated Jan. 20, 2017.
Advisory Action for U.S. Appl. No. 14/217,249 dated Jan. 26, 2017.
Notice of Allowance for U.S. Appl. No. 14/687,700 dated Jan. 27, 2016.
Office Action for U.S. Appl. No. 14/690,339 dated Feb. 3, 2017.
Office Action for U.S. Appl. No. 14/616,700 dated Feb. 9, 2017.
Notice of Allowance for U.S. Appl. No. 14/217,365 dated Feb. 10, 2017.
Office Action for U.S. Appl. No. 14/690,305 dated Feb. 10, 2017.
Office Action for U.S. Appl. No. 14/690,349 dated Feb. 8, 2017.
Advisory Action for U.S. Appl. No. 14/689,019 dated Feb. 17, 2017.
Office Action for U.S. Appl. No. 14/690,349 dated Feb. 27, 2017.
Notice of allowance/allowability for U.S. Appl. No. 14/803,107 dated Mar. 28, 2016.
Office Action for U.S. Appl. No. 14/217,334 dated Apr. 4, 2016.
Office Action for U.S. Appl. No. 14/855,245 dated Oct. 26, 2016.
Office Action for U.S. Appl. No. 14/217,249 dated Oct. 28, 2016.
Office Action for U.S. Appl. No. 14/217,399 dated Nov. 1, 2016.
Office Action for U.S. Appl. No. 14/217,291 dated Nov. 3, 2016.
Office Action for U.S. Appl. No. 14/217,947 dated Nov. 4, 2016.
Office Action for U.S. Appl. No. 14/216,627 dated Nov. 7, 2016.
Office Action for U.S. Appl. No. 14/689,019 dated Nov. 18, 2016.
Office Action for U.S. Appl. No. 14/684,399 dated Nov. 21, 2016.
Notice of Allowance for U.S. Appl. No. 14/689,045 dated Nov. 21, 2016.
Notice of Allowance for U.S. Appl. No. 14/217,334 dated Nov. 23, 2016.
Office Action for U.S. Appl. No. 14/215,414 dated May 20, 2016.
Office Action for U.S. Appl. No. 14/616,700 dated May 20, 2016.
Office Action for U.S. Appl. No. 14/689,019 dated May 20, 2016.
Advisory Action for U.S. Appl. No. 14/217,316 dated May 19, 2016.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Advisory Action for U.S. Appl. No. 14/217,334 dated Jun. 13, 2016.
Office Action for U.S. Appl. No. 14/217,291 dated Jun. 15, 2016.
Office Action for U.S. Appl. No. 14/616,700 dated Oct. 20, 2016.
Office Action for U.S. Appl. No. 14/217,249 dated Apr. 21, 2016.
Notice of allowance/allowability for U.S. Appl. No. 14/217,467 dated Apr. 20, 2016.
Robert Cooksey et al., A Stateless, Content-Directed Data Prefetching Mechanism, Copyright 2002 ACM.
Office Action for U.S. Appl. No. 14/866,946 dated Jul. 27 2017.
Office Action for U.S. Appl. No. 14/616,700 dated Jun. 2, 2017.
Office Action for U.S. Appl. No. 15/268,533 dated Jun. 2, 2017.
Office Action for U.S. Appl. No. 15/268,536 dated Apr. 27, 2017.
Office Action for U.S. Appl. No. 15/368,598 dated May 19, 2017.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.

(56) References Cited

OTHER PUBLICATIONS

Office Action dated Dec. 4, 2015 for U.S. Appl. No. 14/616,700.
Office Action dated Jun. 4, 2015 for U.S. Appl. No. 14/215,414.
National Science Fountation, Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Notice of allowance/allowability for U.S. Appl. No. 14/217,041 dated Apr. 11, 2016.
Office Action for U.S. Appl. No. 13/475,878 dated Jun. 23, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Advisory Action for U.S. Appl. No. 14/690,305 dated Nov. 25, 2016.
Office Action for U.S. Appl. No. 14/216,937 dated Aug. 15, 2016.
Notice of Allowance for U.S. Appl. No. 14/217,096 dated Dec. 5, 2016.
Notice of Allowance for U.S. Appl. No. 14/217,161 dated Dec. 30, 2016.
Office Action for U.S. Appl. No. 14/866,946 dated Jan. 5, 2017.
Office Action for U.S. Appl. No. 14/688,209 dated Jan. 11, 2017.
Amazon Route 53 Developer Guide API Version Apr. 1, 2013, copyright 2017 by Amazon Web Services.
Host Bus Adapters (HBAs): What you need to know about networking workhorse by Alan Earls, Feb. 2003.
Office Action for U.S. Appl. No. 14/690,243 dated Jan. 13, 2017.
Office Action for U.S. Appl. No. 14/232,801 dated Jan. 19, 2017.
Office Action for U.S. Appl. No. 14/217,365 dated Feb. 18, 2018.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Office Action for U.S. Appl. No. 14/217,096 dated Jul. 12, 2016.
Notice of Allowance for U.S. Appl. No. 14/217,399 dated Jul. 20, 2016.
Office Action for U.S. Appl. No. 14/866,946 dated Jul. 29, 2016.
Notice of Allowance for U.S. Appl. No. 14/217,334 dated Jul. 29, 2016.
Office Action for U.S. Appl. No. 14/690,243 dated Aug. 11, 2016.
Office Action for U.S. Appl. No. 14/690,370 dated Aug. 12, 2016.
Working Draft American National Standard Project T10/1601-D Information Technology Serial Attached SCSI—1.1 (SAS—1.1), Mar. 13, 2004 Revision 4.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. 13/475,878.
Office Action dated May 22, 2015 for U.S. Appl. No. 13/253,912.
Notice of allowance/allowability for U.S. Appl. No. 14/217,365 dated Oct. 18, 2016.
Office Action dated Dec. 15, 2015 for U.S. Appl. No. 13/253,912.
Office Action dated Dec. 15, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Office Action for U.S. Appl. No. 14/217,316 dated Aug. 25, 2016.
Office Action for U.S. Appl. No. 14/690,305 dated Aug. 26, 2016.
Advisory Action for U.S. Appl. No. 14/217,291 dated Sep. 9, 2016.
Advisory Action for U.S. Appl. No. 14/689,045 dated Sep. 16, 2016.
Notice of Allowance for U.S. Appl. No. 14/182,303 dated Sep. 12, 2016.
Advisory Action for U.S. Appl. No. 14/690,114 dated Sep. 12, 2016.
Notice of Allowance for U.S. Appl. No. 14/215,414 dated Sep. 23, 2016.
Advisory Action for U.S. Appl. No. 14/866,946 dated Oct. 13, 2016.
Office Action for U.S. Appl. No. 14/687,700 dated Sep. 26, 2016.
Office Action for U.S. Appl. No. 15/170,768 dated Oct. 6, 2016.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Notice of allowance/allowability for U.S. Appl. No. 13/253,912 dated Mar. 21, 2016.

\* cited by examiner

INTERRUPT COALESCING

CROSS-REFERENCE(S) TO RELATED APPLICATIONS

This application claims the benefit of and priority to U.S. Provisional Application 61/980,632, filed 17 Apr. 2014. This U.S. Provisional Application 61/980,632 is hereby fully incorporated herein by reference.

FIELD

Embodiments of the invention relate generally to interrupt handling systems which are typically applied to computer systems and/or System-on-Chip (SoC) applications.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure.

Computers usually provide a way to start software routines in response to asynchronous events. These events are signaled to the Central Processing Unit (CPU) via interrupt requests. The CPU has a specifically written piece of software to handle the interrupts. This software is called an interrupt service routine or interrupt handler.

Interrupts were originated to avoid wasting the CPU's valuable time in software loops (also called polling loops) waiting for events. Instead, the CPU was able to do other tasks while the event is pending. When the event occurred, the interrupt would signal the CPU to execute the interrupt service routine. Before the CPU can start processing the interrupt service routine, the CPU must first save the state of the current task that the CPU is handling. When the CPU is done executing the interrupt service routine, the saved state is restored to continue the processing of the saved task.

In the modern computer systems, interrupts allow the CPU to respond promptly to events, while other work or task is performed. As the CPU's function becomes complicated, the number of tasks that the CPU is required to perform increases as well. Therefore, the CPU is periodically interrupted and in effect, the CPU's performance is reduced because the saving and retrieving of the CPU's current execution adds finite time to the processing of each of the interrupts. However, with the below-discussed method called "interrupt coalescing" in one embodiment of the invention, interrupt events are collected by the interrupt controller and are signaled to the CPU only when certain events are satisfied. This method in an embodiment of the invention advantageously reduces the interrupt processing overhead of the CPU (the time spent for saving and restoring the current execution) in a busy system. Therefore, the performance of the CPU is being optimized, and the throughput of the system is increased in accordance with at least one embodiment of the invention.

One example of a current method and system for generating interrupts is disclosed in, for example, U.S. Pat. No. 5,708,814. However, while the conventional solutions are suited for their intended purposes, the conventional solutions are also subject to at least one or more shortcomings and/or limitations.

SUMMARY

Interrupt handling for current complex computer systems is quite difficult to manage. There should be an efficient way on handling multiple interrupts from various interfaces so that the time of the CPU for responding to each interface would be managed in such a way that not every interrupt events from each interface would cause the CPU to hold and save its current execution in order to service the interrupt request. One method or apparatus to manage such cases is through the implementation of an interrupt coalescing mechanism in an embodiment of the invention. An embodiment of the invention also provides a method of generating an interrupt to the CPU whenever a certain amount of interrupts is received by the interrupt controller or if a timeout count has expired. The assertion of coalesced interrupt is based on the interrupt ranges and timeout counts that is firmware configurable. When the certain condition for the assertion of coalesced interrupt is met, the interrupt controller will generate coalesced interrupts to the processor (e.g., CPU). As soon as the processor has serviced all the coalesced interrupts, the interrupt controller will capture again actual interrupts until the interrupt controller generates another set of coalesced interrupts. With this feature, the number of interrupts to the processor is being reduced, and thus the performance of the processor is being optimized because the processor can have more time for other tasks. In another embodiment, the interrupt controller continuously capture interrupts while the processor services the coalesced interrupts. In this case, the interrupt controller generates the next set of coalesced interrupts when the certain condition for the assertion of this next set of coalesced interrupts is met.

Accordingly, embodiments of the invention may include at least one or more of the following. In an embodiment of the invention, a method comprises: collecting a plurality of interrupts and servicing coalesced active interrupts to a processor if an interrupt count limit has occurred or if a timeout count has expired.

In another embodiment of the invention, an apparatus comprises: an interrupt controller configured to collect a plurality of interrupts and configured to service coalesced active interrupts to a processor if an interrupt count limit has occurred or if a timeout count has expired.

In yet another embodiment of the invention, an article of manufacture comprises: a non-transient computer-readable medium having stored thereon instructions that permit a method comprising: collecting a plurality of interrupts and servicing coalesced active interrupts to a processor if an interrupt count limit has occurred or if a timeout count has expired.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

Figure 1:
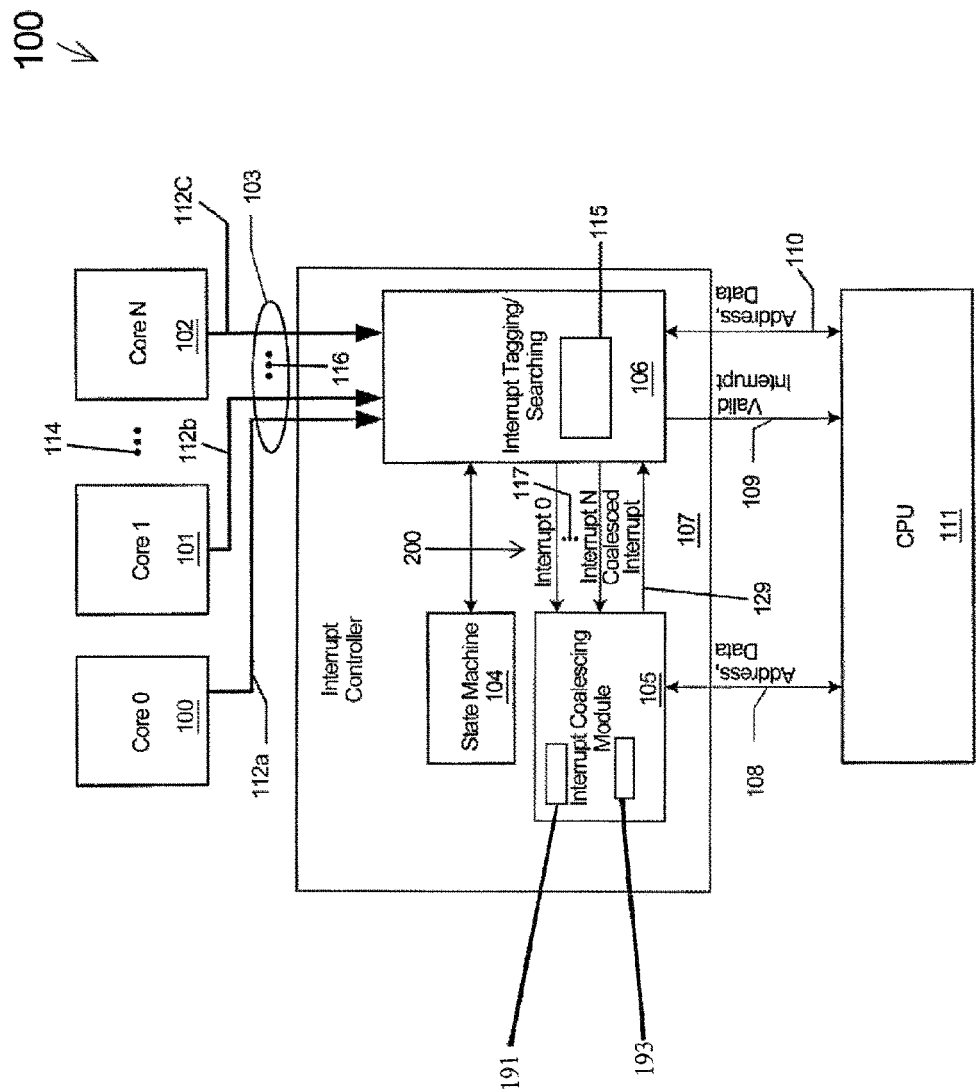
FIG. 1 is a diagram illustrating an apparatus (system) comprising an interrupt controller module and interrupt controller sub-modules connected to several core modules and to a processor (e.g., CPU), wherein the sub-modules comprises an interrupt tagging/search block including an interrupt stack register, an interrupt coalescing module, and a state machine module, according to an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

An embodiment of the invention can solve the problem of frequent interrupts to the processor (e.g., CPU) wherein these frequent interrupts tend to reduce the over-all system performance of the processor. An embodiment of the invention can also have a flexible number of groups wherein each group has its unique configurable settings for waiting time and interrupt count limit. Another embodiment of the invention also has an option for generating an immediate interrupt which is also a firmware configurable setting.

FIG. 1 is a diagram illustrating an apparatus 100 (system 100) comprising the interrupt controller module 107 having interrupt controller sub-modules which are connected to several core modules (e.g., core modules 100, 101, 102) and to a processor 111 (e.g., CPU 111), according to an embodiment of the invention. The core modules 100, 101, 102 may vary in number as noted by, for example, the dots symbols 114. In an embodiment, the interrupt controller 107 (i.e., interrupt controller module 107) comprises interrupt controller sub-modules that include the interrupt tagging/searching block 106, interrupt coalescing module 105, and state machine 104. The interrupt controller 107 is interfaced to several core modules 100, 101 and 102. In particular, the interrupt tagging/searching block 106 is interfaced to the core modules 100, 101, and 102. On the other side, the interrupt controller 107 is connected to the processor 111 (e.g., CPU 111). CPU 111 can be a single CPU or a group of multiple CPUs. In particular, the interrupt coalescing module 105 and interrupt tagging/searching block 106 is interfaced to processor (CPU) 111.

Core modules 100, 101 and 102 can be any interrupt source cores or interface engines that can be connected to the CPU 111. Each core module 100, 101 and 102 has a dedicated interrupt signal and interrupt information like interrupt tag, interrupt source index, and interrupt status (illustrated at each line at group 103) transmitted to the interrupt controller 107. For example, cores 100, 101, and 102 transmit the core interrupt signals 112a, 112b, and 112c, respectively, among the group 103. The core interrupt signals from the core modules may vary in number as noted by, for example, the dot symbols 116. The signal 112a comprises a dedicated interrupt signal and interrupt information, wherein the interrupt information comprises an interrupt tag, interrupt source index, and interrupt status. The signals 112b and 112c also comprise respective dedicated interrupt signals and respective interrupt information.

Interrupt controller 107 comprises the interrupt tagging/searching block 106, the interrupt coalescing module 105, and the state machine 104. Core interrupt signals of group 103 are received by the interrupt tagging/searching block 106 for tagging and stacking mechanism. Each core interrupt signal of group 103 is also passed through the interrupt coalescing module 105 as an output active interrupt 0 to output active interrupt N of interrupt tagging/searching block 106 after the interrupt tagging/searching block 106 confirms that interrupt is valid by checking the valid interrupt signal(s) (in the group 103) that comes from each core 100-102. The parameter N can be any suitable integer. The active interrupts (0 to N) may vary in number as noted by, for example, the dot symbols 117. The active interrupt 0 to output active interrupt N are also shown as active interrupts 200 in FIG. 2.

The state machine 104 controls the ready status and busy status of an interrupt stack register 115 located in the interrupt tagging/searching block 106. Interrupt coalescing module 105 generates coalesced interrupt signal 129 based on the interrupt settings configured by the CPU 111 via data and address bus 108 or interrupt settings based on the default reset value settings in case there is no update made by the CPU 111. In response to the coalesced interrupt signal 129, the interrupt tagging/searching block 106 sends the valid interrupt signal 109 to the CPU 111 for an interrupt service routine execution. When the CPU 111 receives the valid interrupt 109, the CPU 111 reads the interrupt information like interrupt tag, interrupt source index, and interrupt status, from the stack register 115 of the interrupt tagging/searching block 106 via address and data bus 110. The CPU 111 can proceed to execution of the interrupt service routine after the CPU 111 has read the stack register 115 containing the information about the interrupt. In response to the valid interrupt signal 109, the interrupt service routine of the CPU 111 will service the coalesced interrupts (wherein the coalesced interrupts comprise the active interrupts 112*a* through 112*c* that have been collected and coalesced by the interrupt tagging/searching module 106).

After the CPU 111 has completed servicing of the coalesced interrupts, the CPU 111 writes back the interrupt information to the stack registers 115 of the interrupt tagging/searching block 106 via address and data bus 110. Interrupt tagging/searching block 106 makes a comparison on the current content of the stack register 115 against the content written back by CPU 111 via bus 110. If the contents in the comparison are the equal, then the interrupt stack register 115 in the interrupt tagging/searching block 106 is cleared by the state machine 104 and the valid interrupt signal 109 to CPU 111 is de-asserted by the interrupt tagging/searching block 106.

In another embodiment of the invention, the CPU 111 reads Interrupt DONE Count register (191) inside the interrupt coalescing module 105. This indicates how many outstanding interrupts have been collected and coalesced into the valid interrupt signal 109. The "read" from the stack register 115 can be done multiple times depending on the value in Interrupt DONE Count.

Figure 2:
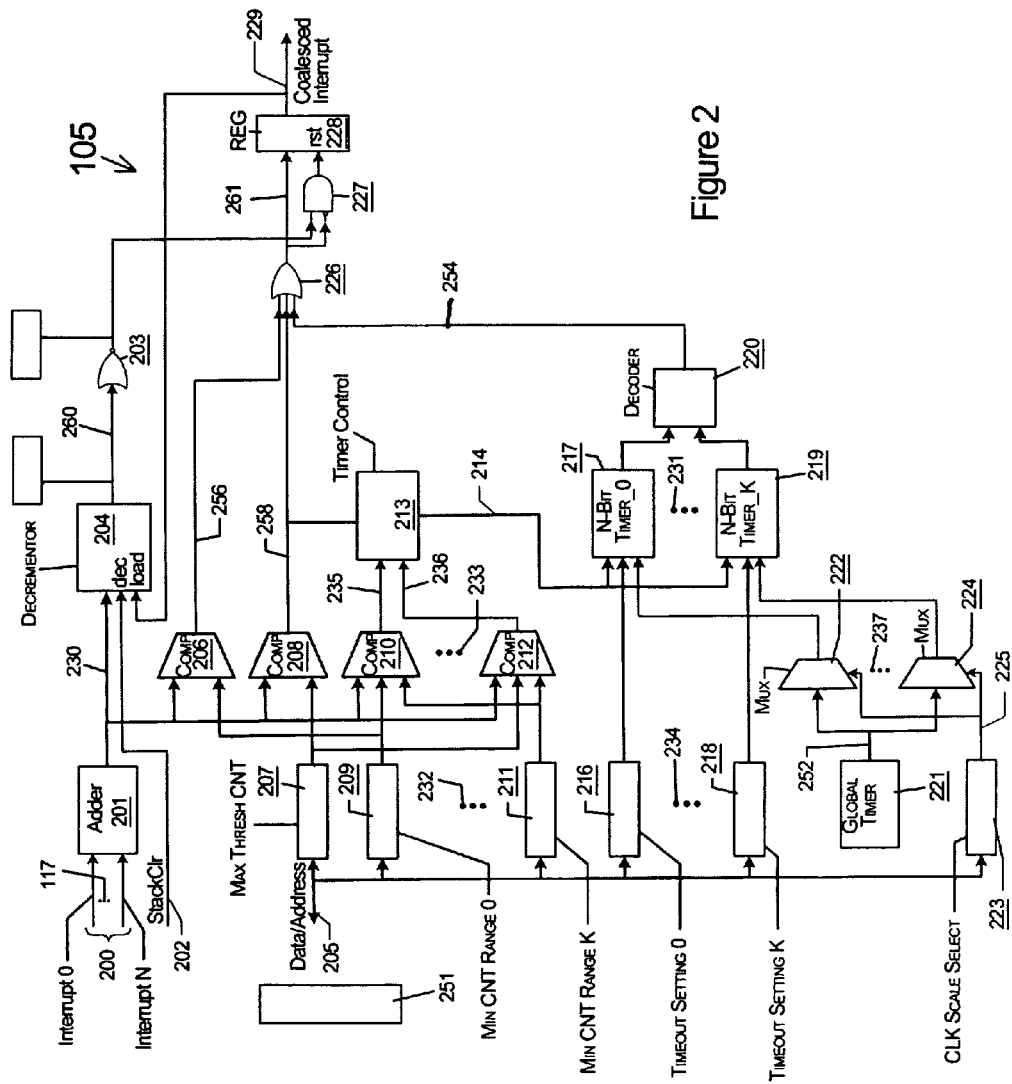
FIG. 2 is a diagram illustrating an interrupt coalescing module which comprises the register settings, comparators, timers, and other sub-blocks for interrupt coalescing operations, according to an embodiment of the invention.

FIG. 2 is a diagram illustrating an interrupt coalescing module 105 which comprises the register settings, comparators, timers, and other sub-blocks for an interrupt coalescing operations, according to an embodiment of the invention. The adder 201 (in the interrupt coalescing module 105) receives each active interrupt 0 to interrupt N signals of group 200 which are output signals from interrupt tagging/searching block 106. These output signals group 200 are captured to become level signals, and are summed by adder 201. Every time there is/are new active interrupt/s of group 200, the adder 201 automatically updates the sum 230 of the adder 201. The result of the addition of the adder 201, checking of comparators, timer settings, and decoders determines the assertion of the coalesced interrupt 229. The value 230 is reflected in the Interrupt Done Count register (191). Coalesced interrupt 229 is also shown as coalesced interrupt 129 in FIG. 1.

The bus 205 (e.g., a signal path 205, or one or more data paths and/or address paths) is used for programming the values 207, 209 and 211, 216 and 218, 221, and 223. The values 207, 209 through 211, 216 through 218, 221, and 223 are set in, for example, one or more respective registers 251, and are also values that are programmable by firmware or software.

According to an embodiment of the invention, there are two ways coalesced interrupt is asserted. The first technique (way) is based on the predetermined number of interrupts and the second technique (way) is based on a predetermined timeout delay. If the sum of active interrupts output 230 by adder 201 is equal to or greater than the predetermined value set on the register maximum threshold count 207, or less than the predetermined value set on register minimum count range 0 209, then the coalesced interrupt signal 229 is asserted immediately. In this case, the coalesced interrupt signal 229 is sometimes called an "immediate interrupt" since the coalesced interrupt signal 229 does not need to wait for some delay time or interrupt asserts on zero delay time. The predetermined value set on register maximum threshold count 207 is checked by the comparator 208 and compared with the sum of active interrupts output 230. Comparator 208 outputs "1" or "high" when this comparison is true. In the same way, the predetermined value set on register minimum count range 0 209 is checked by comparator 206 and compared with the sum of active interrupts output 230. Comparator 206 outputs "1" or "high" when this comparison is true.

If the sum of active interrupts 230 that are output by adder 201 is equal or greater than the predetermined value set on register minimum count range 0 209 and less than the predetermined value set on register maximum threshold count 207, the assertion of coalesced interrupt 229 will be based on the predetermined timeout delays as performed by the N-BIT TIMER_0 217 through N-BIT TIMER_K 219. The N-BIT timers (e.g., N-BIT timers 217 and 219 in FIG. 2) may vary in number as noted by, for example, the dot symbols 231. Therefore, there can more than two N-BIT timers in the interrupt coalescing module 105.

The respective predetermined values set on register TIMEOUT SETTING 0 216 to register TIMEOUT SETTING K register 218 are assigned to corresponding N-BIT TIMER_0 timer 217 to N-BIT TIMER_K timer 219, respectively, when TIMER CONTROL 213 outputs enable signals 214. TIMER CONTROL 213 receives output signals 235 and 236 from comparators 210 and 212, respectively. These outputs identify the current timer that is expected to output the timeout signal. According to an embodiment of the invention, if the number of active interrupts 230 as resulted or added in adder 201 is equal or greater than the predetermined value on register minimum count range 0 209 and less than the predetermined value set on register minimum count range K 211, comparator 210 will output "1" or "high" and therefore the corresponding timer, N-BIT TIMER_0 217, will be enabled by the TIMER CONTROL 213 output 214. It should be noted that as soon as the N-BIT TIMER_0 217 is enabled, all timers (up to N-BIT TIMER_K 219) are also enabled. When sum output 230 of adder 201 became equal or greater than the register minimum count range K 211, N-BIT TIMER_0 217 will be disabled and the timeout is expected on N-BIT TIMER_K 219. It should be noted the existence of intermediate minimum count range X's whose value is greater than the register minimum count range 0 209 and less than the register minimum count range K 211. Furthermore, it should also be noted that the predetermined value on register minimum count range 0 209 should be less than the predetermined value on register minimum count range K 211. In the same way, it should also be noted that the corresponding N-bit timers 217 and 219 should be set in such a way that N-BIT TIMER_0 217 will have a delay time less than the delay time of N-BIT TIMER_K 219.

Additionally, the values between (and including) the register minimum count range 0 209 and register minimum count range K 211 may vary in number as noted by, for example, the dot symbols 232. Therefore, there can be one or more additional register minimum count range values in addition to the values 209 and 211. Similarly, there can be one or more additional comparators in addition to the comparators 210 and 212. The one or more additional comparators between the comparators 210 and 212 may vary in number as noted by, for example, the dot symbols 233. Each additional comparator between the comparators 210 and 212 would receive and compare the sum 230 and the additional register minimum count range value between the values 209 and 211.

Additionally, the values between (and including) the register timeout setting 0 216 and register timeout setting K 218 may vary in number as noted by, for example, the dot symbols 234. Therefore, there can be one or more additional register timeout setting values in addition to the values 216 and 218. The one or more additional N-BIT timers between the N-BIT TIMER_0 217 and N-BIT TIMER_K 219 would receive the additional timeout settings value between the values 216 and 218.

There are two ways on configuring the delay time for each timer (N-BIT TIMER_0 217 to N-BIT TIMER_K 219). The first way is through the configuration of the predetermined values on register TIMEOUT SETTING 0 216 to register TIMEOUT SETTING K 218. Assuming the input clock frequency (which is any output bit 252 from X-bit width GLOBAL TIMER 221) used by N-BIT TIMER_0 217 to N-BIT TIMER_K 219 are of the same granularity or time scale, setting the register TIMEOUT SETTING 0 216 less than register TIMEOUT SETTING K 218 ensures that delay time for N-BIT TIMER_0 217 is faster or less than N-BIT TIMER_K 219. In the same way, assuming the predetermined values on register TIMEOUT SETTING 0 216 to register TIMEOUT SETTING K 218 are the same, setting the predetermined value of register CLK SCALE SELECT 223 in such a way that the selector 225 for multiplexer 222 selects the faster frequency than the select line 225 for multiplexer 224 so that N-BIT TIMER_0 217 will be faster than N-BIT TIMER_K 219. The input clock frequency to multiplexers 222 and 224 defines different granularity or time scale which is any bit from X-bit width reference timer or GLOBAL TIMER 221. For example, GLOBAL TIMER 221 is 4-bit width timer. Bit 0, bit 1, bit 2 and bit 3 outputs of GLOBAL TIMER 221 are the reference clock frequencies that are selected via multiplexers 222 and 224. In addition, depending on what register settings will be varied, the condition that N-BIT TIMER_0 217 is faster than N-BIT TIMER_K 219 will be true.

Additionally, there can be one or more additional multiplexers between the multiplexers 222 and 224, wherein this one or more additional multiplexers receive the output bit 252 from global timer 221. The one or more additional multiplexers between the multiplexers 222 and 224 may vary in number as noted by, for example, the dot symbols 237. The one or more additional N-BIT timers between the N-BIT TIMER_0 217 and N-BIT TIMER_K 219 would receive the output of the one or more additional multiplexers between the multiplexers 222 and 224.

The outputs of the n-bit timers 217 and 219 are monitored by DECODER 220. DECODER 220 asserts an output 254 to OR gate 226 whenever any of the timers (timers 217 and 219) elapsed. The output 254 of DECODER 220 is ORed with the outputs (outputs 256, 258) of comparator 206 and comparator 208, respectively, for the coalesced interrupt signal 229.

Whenever coalesced interrupt 229 is asserted, the current sum output 230 of adder 201 is loaded to the DECREMENTOR block 204. When output 260 of DECREMENTOR 204 becomes zero (decoded by NOR gate 203) and the output 261 of OR gate 226 is zero, AND gate 227 will be asserted and register 228 will be reset and coalesced interrupt output 229 will be de-asserted. When decrement signal 202 goes high, the current value of DECREMENTOR block 204 is decreased by one. Decrement signal 202 is asserted when the CPU 111 clears the interrupt register 115 (FIG. 1) in the interrupt tagging/searching block 106. After the CPU 111 has completed servicing an interrupt, the CPU 111 writes back the interrupt information to the stack registers 115 of the interrupt tagging/searching block 106 via address and data bus 110. Interrupt tagging/searching block 106 makes a comparison on the current content of the stack register 115 against the one written back by CPU 111. If comparison is the equal, then interrupt register 115 in the interrupt tagging/searching block 106 is cleared and the coalesced interrupt signal 109 to CPU 111 is de-asserted.

In another embodiment of the invention, Decrement signal 202 is asserted when the CPU reads the interrupt stack register 115 in the interrupt tagging/searching block 106. When decrement signal 202 goes high, the current value of DECREMENTOR block 204 is decreased by one. After the CPU 111 has completed servicing of the coalesced interrupts, the CPU 111 sends a request to clear the DONE status bit (one of the bits of the Interrupt Done Status register (193)) by writing to the Interrupt Done Status Register (193) inside the interrupt coalescing module 105 via address and data bus 110.

Upon receiving CPU 111's clear request, the Interrupt Done Status Register (193) clears the DONE status bit when the output 260 of DECREMENTOR 2014 becomes zero.

When output 260 of DECREMENTOR 204 becomes zero (decoded by NOR gate 203) and the output 261 of OR gate 226 is zero, AND gate 227 will be asserted and register 228 will be reset and coalesced interrupt output 229 will be de-asserted. Consequently, the valid interrupt signal 109 to CPU 111 is de-asserted by the interrupt tagging/searching block 106.

Figure 3:
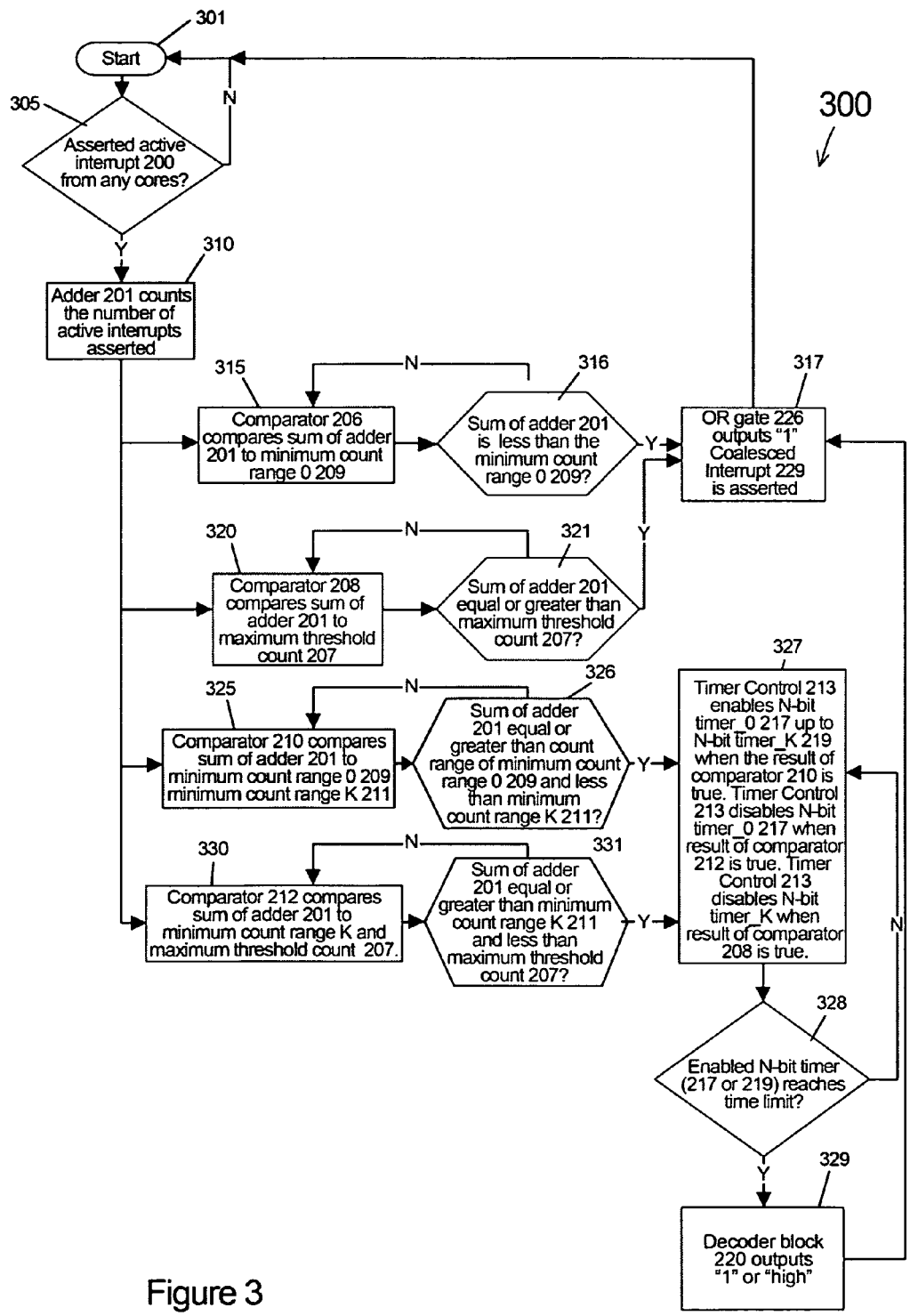
FIG. 3 is a diagram illustrating a process flow of how interrupts received from interface cores are being coalesced, according to an embodiment of the invention.

FIG. 3 is a diagram illustrating a process flow 300 (or method 300) of how interrupts received from interface cores are being coalesced, according to an embodiment of the invention.

Reference is now made to both FIG. 2 and FIG. 3. At 301, the method 300 will start. At 305, the method 300 checks for an asserted active interrupt 200 from any core (e.g., cores 100, 101, and/or 102 in FIG. 1). If there is no asserted active interrupt 200, then the method 300 will start again at 301. At 305, if there is there is an asserted active interrupt 200, then the method 300 will perform the operations at 310. In the method 300, the term "operations" can mean a single operation, a single sequence, or a single step, or can mean a plurality of operations, a plurality of sequences, or a plurality of steps.

At 310, the adder 201 counts the number of active interrupts 200 that are asserted. The method 300 then performs the operations at 315, 320, 325, and 330. Typically, the operations at 315, 320, 325, and 330 are performed in a parallel manner and/or concurrently.

At 315, the comparator 206 compares the sum 230 of the adder 201 to the minimum count range 0 209. At 316, the method 300 determines if the sum 230 of the adder 201 is less than the minimum count range 0 209. At 316, if the sum 230 of the adder 201 is not less than the minimum count range 0 209, then the method 300 will again perform the operations at 315. At 316, if the sum 230 of the adder 201 is less than the minimum count range 0 209, then the method 300 will perform the operations at 317. At 317, the OR gate 226 outputs a signal 261 with a value of "1" (or "high") and the register 228 asserts the coalesced interrupt 229. The coalesced interrupt 229 is similarly discussed above as coalesced interrupt 129 with reference to FIG. 1. The method 300 then returns to 301 after asserting the coalesced interrupt 229 at 317.

At 320, the comparator 208 compares the sum 230 of the adder 201 to the maximum threshold count 207. At 321, the method 300 determines if the sum 230 of the adder 201 is equal to or greater than the maximum threshold count 207. At 321, if the sum 230 of the adder 201 is _NOT_ (EQUAL _ OR_ GREATER) (which is _NOT_ EQUAL _ AND_ _ NOT_ GREATER or In boolean logic notation: (A|B)'=A' & B') than the maximum threshold count 207, then the method 300 will again perform the operations at 320. At 321, if the sum 230 of the adder 201 is equal to or greater than the maximum threshold count 207, then the method 300 will perform the operations at 317, as similarly discussed above, wherein the register 228 asserts the coalesced interrupt 229. The method 300 then returns to 301 after asserting the coalesced interrupt 229 at 317.

At 325, the comparator 210 compares the sum 230 of the adder 201 to the minimum count range 0 209 and up to the minimum count range K 211. At 326, the method 300 checks if the sum 230 of the adder 201 is equal to or greater than the count range of minimum count range 0 209, and also checks if the sum 230 is less than the minimum count range K 211. At 326, if the sum 230 of the adder 201 is as follows:

Let A=EQUAL to Min Count Range 0 209
Let B=GREATER THAN Min Count Range 0 209
Let C=LESS THAN Min Count Range K 211
Logical Notation:
((A|B) & C)'=(A|B)'|C'=A' & B'|C'
_NOT_ EQUAL _AND_ _NOT_ GREATER THAN Min Count Range 0 209 _OR_ _NOT_ LESS THAN Min Count Range K 211, then the method 300 will again perform the operations in 325. At 326, if the sum 230 of the adder 201 is equal to or greater than the minimum count range 0 209, and if the sum 230 of the adder 201 is less than the minimum count range K 211, then the method 300 will perform the operations at 327. The parameter K can any suitable integer value. At 327, the timer control 213 enables the N-bit timer_0 217 and up to the N-bit timer_K 219 if the result of the comparator 210 is true. The parameter N can be any suitable integer value. At 327, the timer control 213 disables the N-bit timer 217 if the result of the comparator 212 is true. At 327, the timer control 213 disables the N-bit timer_K 219 if the result of the comparator 208 is true. At 328, the method 300 then checks if the enabled N-bit timer (timer 217 or timer 219) has reached a time limit. At 328, if the enabled N-bit timer (timer 217 or timer 219) has not yet reached a time limit, then the method 300 will perform the operations at 327. At 328, if the enabled N-bit timer (timer 217 or timer 219) has reached a time limit, then the method 300 will perform the operations at 329. At 329, the decoder block 220 (or decoder 220) outputs a decoder signal 254 that has a value of "1" or "high". The method 300 then performs the operations at 317 wherein the coalesced interrupt 229 is asserted, as similarly discussed above. The method 300 then returns to 301 after asserting the coalesced interrupt 229 at 317.

At 330, the comparator 212 compares the sum 230 of the adder 201 to the minimum count range K 211, and compares the sum 230 of the adder 201 to the maximum threshold count 207. At 331, the method 300 checks if the sum 230 of the adder 201 is equal to or greater than the minimum count range K 211, and checks if the sum 230 of the adder 201 is less than the maximum threshold count 207. At 331, if the sum 230 of the adder 201 is _NOT_(EQUAL _OR_ GREATER) (which is _NOT_ EQUAL _AND_ NOT_ GREATER or In boolean logic notation: (A|B)'=A' & B') than the threshold count 207, then the method 300 performs the operations at 330. At 331, if the sum 230 of the adder 201 is equal to or greater than the minimum count range K 211, and if the sum 230 of the adder 201 is less than the maximum threshold count 207, then the method 300 performs the operations at 327 and the method 300 then performs the subsequent operations at 328 and 329 as all similarly discussed above. The method 300 then returns to 301 after asserting the coalesced interrupt 229 at 317.

Interrupt Coalescing is a method of generating an interrupt to the CPU whenever a certain amount of interrupts is received by the interrupt controller, in an embodiment of the invention. The assertion of coalesced interrupts is based on the interrupt ranges and timeout counts. Interrupt ranges and timeout settings are typically firmware configurable. With this method in an embodiment of the invention, the number of interrupts to the processor is being reduced, and thus the performance of the processor is being optimized because the processor can have more time for other tasks. Another embodiment of the invention provides an apparatus that performs the above-mentioned operations.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   collecting a plurality of interrupts;
   if coalesced active interrupts have not exceeded an interrupt count limit, then enabling a timer; and
   servicing the coalesced active interrupts to a processor if the coalesced active interrupts have exceeded the interrupt count limit or if a timeout count of the timer has expired;
   wherein servicing the coalesced active interrupts comprises:
   comparing a sum of active interrupts to a minimum count range 0 and up to a minimum count range K, wherein K is an integer;
   if the sum of the active interrupts is equal to or is greater than the minimum count range 0, and if the sum of the active interrupts is less than the minimum count range K, then waiting for the timeout count to expire before servicing the coalesced active interrupts.

2. The method of claim 1, wherein servicing the coalesced active interrupts comprises:
   if a sum of active interrupts is equal to or greater than the interrupt count limit or is less than a predetermined value set on a minimum count range 0, then servicing the coalesced active interrupts.

3. The method of claim 1, wherein servicing the coalesced active interrupts comprises:
   comparing a sum of active interrupts to first predetermined value set on a minimum count range 0;
   if the sum of the active interrupts is less than the minimum count range 0, then servicing the coalesced active interrupts.

4. The method of claim 1, wherein servicing the coalesced active interrupts comprises:
   comparing a sum of active interrupts to a maximum threshold count;
   if the sum of the active interrupts is equal to or greater than the maximum threshold count, then servicing the coalesced active interrupts.

5. The method of claim 1, further comprising:
   asserting a coalesced interrupt signal to permit servicing of the coalesced active interrupts.

6. The method of claim 5, further comprising:
   clearing an interrupt stack register so that the coalesced interrupt signal is de-asserted.

7. The method of claim 1, wherein the interrupt count limit and timeout count are programmable values.

8. An apparatus, comprising:
   an interrupt controller configured to collect a plurality of interrupts, configured to enable a timer if coalesced active interrupts have not exceeded an interrupt count limit, and configured to service the coalesced active interrupts to a processor if the coalesced active interrupts have exceeded the interrupt count limit or if a timeout count of the timer has expired;
   wherein the interrupt controller is configured to wait for the timeout count to expire before servicing the coalesced active interrupts based on a comparison of a sum of active interrupts to a minimum count range 0 and up to a minimum count range K, wherein K is an integer and if the sum of the active interrupts is equal to or is greater than the minimum count range 0, and if the sum of the active interrupts is less than the minimum count range K.

9. The apparatus of claim 8, wherein the interrupt controller is configured to service the coalesced active interrupts if a sum of active interrupts is equal to or greater than the interrupt count limit or is less than a predetermined value set on a minimum count range 0.

10. The apparatus of claim 8, wherein the interrupt controller is configured to service the coalesced active interrupts based on a comparison of a sum of active interrupts to first predetermined value set on a minimum count range 0 and if the sum of the active interrupts is less than the minimum count range 0.

11. The apparatus of claim 8, wherein the interrupt controller is configured to service the coalesced active interrupts based on a comparison of a sum of active interrupts to a maximum threshold count and if the sum of the active interrupts is equal to or greater than the maximum threshold count.

12. The apparatus of claim 8, wherein the interrupt controller is configured to assert a coalesced interrupt signal to permit servicing of the coalesced active interrupts.

13. The apparatus of claim 12, wherein the interrupt controller is configured to clear an interrupt stack register so that the coalesced interrupt signal is de-asserted.

14. The apparatus of claim 8, wherein the interrupt count limit and timeout count are programmable values.

15. An article of manufacture, comprising:
    a non-transitory computer-readable medium having stored thereon instructions operable to permit an apparatus to:
    collect a plurality of interrupts;
    enable a timer if coalesced active interrupts have not exceeded an interrupt count limit; and
    service the coalesced active interrupts to a processor if the coalesced active interrupts have exceeded the interrupt count limit or if a timeout count of the timer has expired;
    wherein the instructions are operable to permit the apparatus to service the coalesced active interrupts so that the apparatus:
    compares a sum of active interrupts to a minimum count range 0 and up to a minimum count range K, wherein K is an integer;
    if the sum of the active interrupts is equal to or is greater than the minimum count range 0, and if the sum of the active interrupts is less than the minimum count range K, then the apparatus waits for the timeout count to expire before servicing the coalesced active interrupts.

16. The article of manufacture of claim 15, wherein the instructions are operable to permit the apparatus to service the coalesced active interrupts so that
    if a sum of active interrupts is equal to or greater than the interrupt count limit or is less than a predetermined value set on a minimum count range 0, then the apparatus services the coalesced active interrupts.

17. The article of manufacture of claim 15, wherein the instructions are operable to permit the apparatus to service the coalesced active interrupts so that the apparatus
    compares a sum of active interrupts to first predetermined value set on a minimum count range 0; and
    if the sum of the active interrupts is less than the minimum count range 0, then the apparatus services the coalesced active interrupts.

18. The article of manufacture of claim 15, wherein the instructions are operable to permit the apparatus to service the coalesced active interrupts wherein the apparatus
    compares a sum of active interrupts to a maximum threshold count; and if the sum of the active interrupts is equal to or greater than the maximum threshold count, then the apparatus services the coalesced active interrupts.

\* \* \* \* \*